United States Patent [19]

Aplenc

[11] 4,448,022
[45] May 15, 1984

[54] DOWNHOLE LIQUID TRAP FOR A GEOTHERMAL PUMPING SYSTEM

[75] Inventor: Andrej M. R. Aplenc, Hines County, Miss.

[73] Assignee: Sperry Corporation, New York, N.Y.

[21] Appl. No.: 274,838

[22] Filed: Jun. 18, 1981

[51] Int. Cl.$^3$ ............................................... F03G 7/00
[52] U.S. Cl. ..................................... 60/641.4; 417/379
[58] Field of Search ............... 60/641.2, 641.3, 641.4, 60/641.5, 646, 657; 417/379

[56] References Cited

U.S. PATENT DOCUMENTS

| | | | |
|---|---|---|---|
| 3,898,020 | 8/1975 | Matthews | 60/641.4 |
| 3,967,448 | 7/1976 | Matthews | 60/641.4 |
| 4,077,220 | 3/1978 | Matthews | 60/641.4 |

Primary Examiner—Allen M. Ostrager
Attorney, Agent, or Firm—Howard P. Terry

[57] ABSTRACT

In a geothermal energy conversion system having a boiler and a turbine driven pumping unit, a separator is disposed between the boiler and the turbine pump for separating entrained liquid droplets from the vaporized working fluid exhausted from the boiler.

6 Claims, 6 Drawing Figures

DOWNHOLE LIQUID TRAP FOR A GEOTHERMAL PUMPING SYSTEM

BACKGROUND OF THE INVENTION

1. Field of the Invention

This invention relates generally to efficient means for the generation of electrical power or other power utilizing energy from geothermal sources, and more specifically relates to arrangements including efficient steam generation and pumping equipment for application in deep hot wells for transfer of thermal energy to the earth's surface.

2. Description of the Prior Art

A major advance in the art of extraction and use of geothermal energy is described in U.S. Pat. No. 3,824,793, entitled "Geothermal Energy System and Method", by H. B. Matthews, issued July 23, 1974 and assigned to the Applicant's assignee. The prior Matthews invention provides means for efficient power generation employing energy derived from subterranean geothermal sources through the generation of substantially dry super-heated steam and the consequent operation of sub-surface equipment for pumping extremely hot well water at high pressure to the earth's surface. Clean water is injected at a first or surface station into the deep well where thermal energy stored in hot solute-bearing deep well water is used in a boiler at a second or deep well station to generate super-heated steam from the clean water. The resultant substantially dry super-heated steam is used at the well bottom for operating a turbine driven pump for pumping the hot solute bearing well water to the first station at the earth's surface, the water being pumped at all times and locations in the system at pressures which prevent flash steam formation. The highly energetic water is used at the surface or first station in a binary fluid system so that its thermal energy is transferred to a closed-loop surface-located boiler-turbine system for driving an electrical power alternator. Cooled, clean water is regenerated by the surface system for re-injection into the well for operation of the steam turbine therein. Undesired solutes are pumped back into the earth via a separate well in the form of a concentrated brine.

A turbine pump unit well adapted for use with the above described geothermal energy conversion system is described in U.S. Pat. No. 3,908,380, entitled "Geothermal Energy Turbine and Well System" by J. L. Lobach, issued Sept. 30, 1975 and assigned to the Applicant's assignee. The turbine driven pump features a compact and efficient steam turbine configuration adapted for use in the hostile environment of the deep hot-water well. Substantially dry super-heated steam from the boiler passes downwardly to impact turbine blades at the periphery of the turbine wheel. A further feature permits the expanding steam, then to reverse its sense of flow in a compact arrangement returning the steam along the axis of the turbine wheel and then to the earth's surface for further energy recovery.

The quality of the steam at the turbine inlet of the turbine pump unit, however, may vary depending on the particular geometry of the boiler annulus and on other factors affecting the heat transfer rates. Under certain conditions the boiler may be able to generate wet steam only, causing the turbine efficiency, the total turbine power output, and the turbine service life to decrease from their design values. Moreover, the presence of liquid droplets in the incoming high velocity steam will cause corrosion in the turbine and will cause the potentially destructive electro-static charge build-up on the rotating assembly due to the polar nature of water droplets. Accordingly, there is a need for an apparatus which will alleviate the problems associated with a turbine pump unit disposed in a geothermal well and subject to wet steam.

SUMMARY OF THE INVENTION

The apparatus of the present invention provides means for efficient power generation employing energy derived from a geothermal source through the generation of a non-destructive, dry, steam, and the consequent operation of the sub-surface turbine driven equipment for pumping extremely hot well water at high pressure to the earth's surface. The turbine driven pumping equipment is responsive to the super-heated steam exhausted from a boiler. The liquid droplets entrained in steam are separated from the vapor by either centrifugal, gravitational, or inertial separation means. The droplets are collected in a liquid trap, and the vapor is directed into the inlet of the turbine driven pumping equipment. The liquid collected in the trap may be harmlessly flashed back into the exhaust vapor of the turbine driven pumping equipment, thereby enabling the turbine driven pumping equipment to operate most efficiently and preventing damage to the turbine.

DESCRIPTION OF THE PREFERRED EMBODIMENTS

Figure 1:
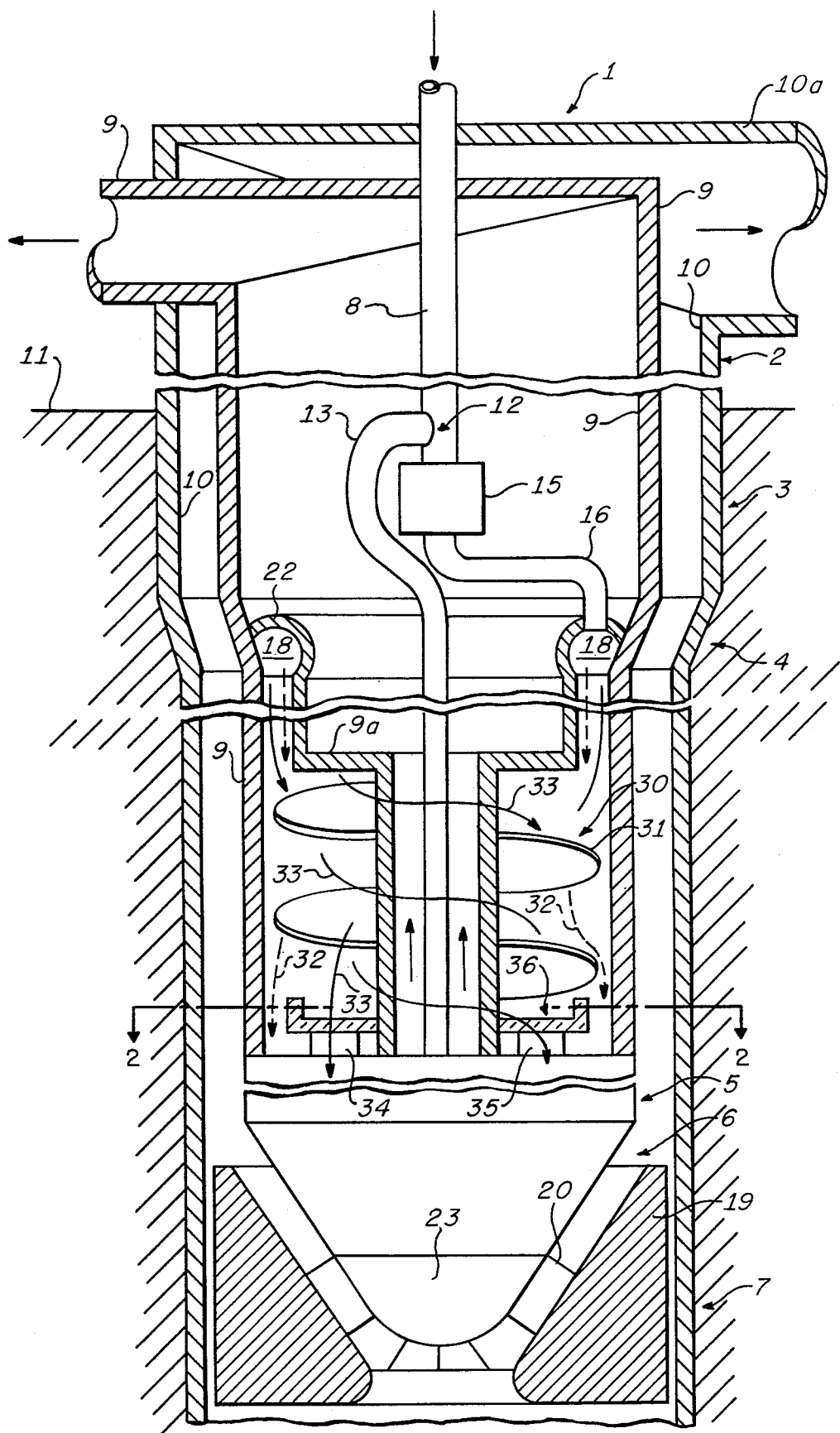
FIG. 1 is an elevation view, mostly in cross-section of the deep well geothermal pumping apparatus.

FIG. 1 illustrates the general structure and characteristics of that portion of the geothermal energy extracting system which is immersed in a deep well extending into strata far below the surface of the earth, preferably being located at a depth below the surface such that a copious supply of extremely hot water under high pressure is naturally available, the active pumping structure being located adjacent the hot water source and within a generally conventional well casing pipe 10. The configuration in FIG. 1 is seen to include a well head section 1 located above the earth's surface 11 and a main well section 2 extending downward from well head section 1 and below the earth's surface 11. At the subterranean source of hot, high pressure water, the main well section 2 joins a boiler or a steam generator input section 3. The boiler or steam generator section 4, the steam turbine section 5, a power plant rotary bearing section 6, and a hot water pumping section 7 follow in close cooperative succession at increasing depths.

Extending downward from the well head section 1 at the earth's surface 11, the well casing pipe 10 surrounds in preferably concentric relation an innermost stainless steel or other high quality alloy steel pipe or conduit 8 for supplying a flow of relatively cool and relatively pure water at the bottom of the well. A second relatively large pipe or conduit 9 of similar quality and surrounding pipe 8 is also provided within well casing 10, extending from well head 1 to the energy conversion and pumping system at the bottom of the well and permitting turbine exhaust steam to flow to the surface of the earth.

It will be seen from FIG. 1 that relatively clean and cold water is pumped down the inner pipe 8 from the surface 11 station to the region of the pipe tee 12. At tee 12, the downward flowing water is divided between two branch paths. A first branch path feeds clean lubricating water through pipes 13 and 17 for lubricating a system of bearings within the system bearing section 6. The second branch path feeds clean water through pressure regulator system 15 and via distribution pipe or pipes 16 to the input manifold 22 of a boiler 18 formed between the generally concentric walls of alloy pipes 9 and 9a. Accordingly a high pressure super-heated steam is generated in the boiler or steam generator 18.

It should be noted that the quality of steam exhausted from the boiler 18 may vary depending upon the particular geometry of the boiler annulus and on other factors affecting the heat transfer rates. Under certan circumstances the boiler 18 may be able to generate wet steam only, causing the turbine efficiency, the total turbine power output, and the turbine service life to decrease from their design values. This wet steam is comprised of vapor and liquid droplets entrained therein. Preferably the vapor and liquid droplets are separated by centrifugal separation means 30 having helical swirler vanes 31 disposed about the pipe 9a. As the wet steam descends from the boiler 18 and enters the separation means 30, it is forced into circular motion by the appropriately shaped vanes 31. The centrifugal acceleration thus induced, forces the water droplets towards the perimeter of the pipe 9 where they coalesce and form a film on the wall. The film is collected in a liquid trap 36 as hereinafter described in greater detail. The flow of the water droplets is represented by the dotted arrows 32, whereas the flow of the vapor is represented by the arrows 33. Consequently, steam essentially devoid of water droplets is directed into a turbine section 5 via pipes 34.

The function of the turbine located at 5 and supported on bearings located within bearing section 6 is to drive a hot water pump located at section 7. Hot, high pressure water is thus impelled upward by the rotating pump vanes 20 between the rotating conical end 23 of the pump and an associated rotating or stationary shroud 19; the hot water is pumped upward at high velocity in the annular conduit between pipes 9 and 10, thus permitting use of the thermal energy it contains at the earth's surface. More important, the hot water is pumped upward to the earth's surface 11 at a pressure preventing it from flashing into and thus undesirably depositing dissolved salts at the point of flashing.

Accordingly, it is seen that the extremely hot, high-pressure well water is pumped upward, flowing in the annular region defined by alloy pipes 9 and 10. Heat supplied by the hot water readily converts the clean water flowing into manifold 22 of the steam generator 18 into high energetic, steam. The clean water, before flowing through tee junction 12 and pressure regulator 15, is at a very high pressure due to its hydrostatic head and usually also to pressure added by a surface pump, so that it may not flash into steam. The pressure regulator system 15 controls the pressure of the clean water flowing therethrough so that it may be vaporized in the boiler on the steam generator 18. The highly energetic steam drives the steam turbine and is redirected to flow upward to the surface 11 after expansion as relatively cool steam flowing within the annular conduit defined between alloy pipes 8 and 9. Thermal energy is recovered at the earth's surface 11 primarily from the hot, high pressure water, but may also be recovered from the turbine exhaust steam.

Figure 2:
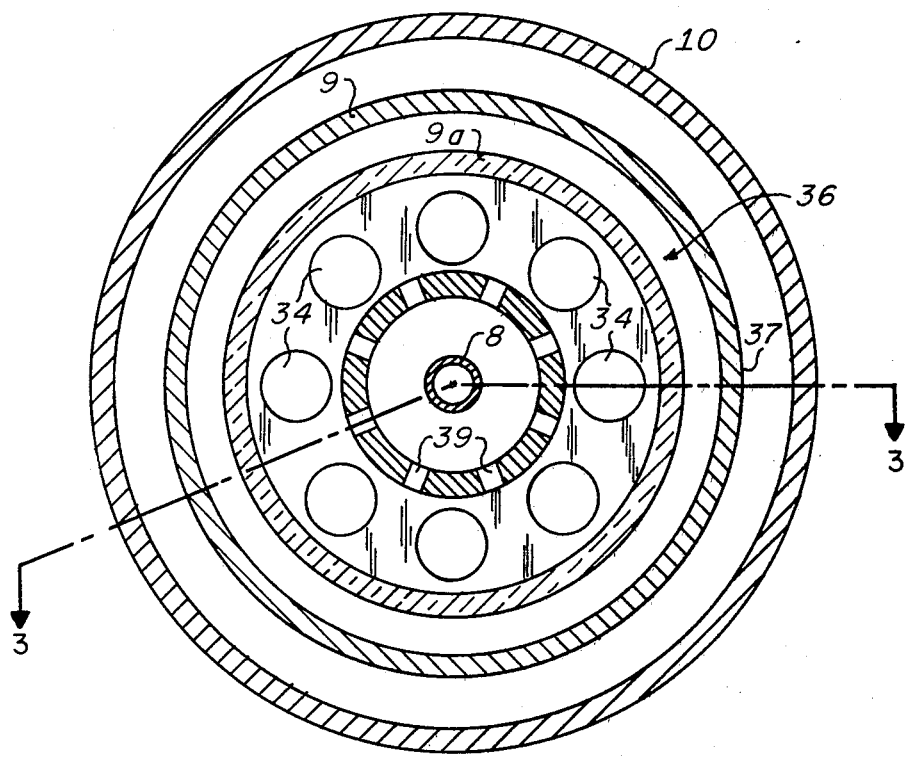
FIG. 2 is a plan view taken along the line 2—2 of FIG. 1.
Figure 3:
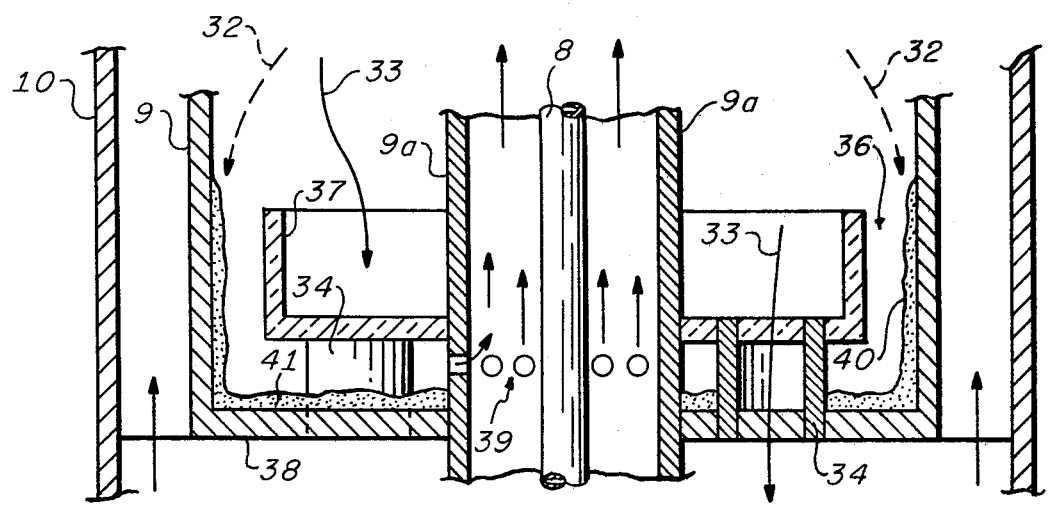
FIG. 3 is a cross sectional view of a liquid trap taken along the line 3—3 of FIG. 2.

Referring now to FIGS. 2 and 3, a plan view of the liquid trap 36 taken along line 2—2 of FIG. 1 is provided and a cross-sectional view of the liquid trap 36 taken along line 3—3 of FIG. 2 is provided. The liquid trap 36 is formed between the pipe 9 and apertured annular member 37 which is fastened to the pipe 9a. The inlet pipes 34 conduct the dry steam from the separating means 30 to the turbine section 5 and extend from the apertured annular member 37 to the inlet of the turbine. The liquid droplets which are separated by the separation means 30 coalesce as a film 40 on the walls of pipe 9 and flow downward to be collected on an apertured annular member 38 which is fastened between pipes 9 and 9a and which forms the bottom of the liquid trap. A plurality of orifices or holes 39 are formed in the pipe 9a between annular members 37, 38. A portion of the film on walls of pipe 9 is boiled off as a result of heat received from the hot brine flowing upward in the conduit formed between pipes 9, 10, and the remaining film accumulates as a liquid pool 41 on the bottom of the liquid trap 36. The collected liquid may be handled in several ways, including flashing it into the upwardly flowing exhaust in conduit 9a from the turbine section 5, or evaporating it in a separate heat exchanger. In the preferred embodiment of the present invention the collected liquid is flashed into the turbine section exhaust through appropriate flow control devices such as orifices 39 or float operated valves.

It should be noted that the liquid trap 36 of FIGS. 2 and 3 allows the liquid and vapor steam to cross. This is accomplished by alternating passages allowing the liquid to flash into the turbine exhaust through orifices 39 and allowing the vapor to proceed towards the steam turbine inlet through conduits 34. The exhaust pipe 9a which extends into the separating means 30 should be properly insulated to prevent excessive heat losses to the exhaust. Moreover, it should be noted that the outside wall 9 of the separation means 30 is in contact with the upwardly flowing hot brine and consequently acts as a boiler for the liquid film which forms therein.

It should be especially noted that the separation means 30 in the preferred embodiment of FIG. 1 includes a centrifugal type of separator having the helical swirler vanes 31, but the apparatus of the present invention is not limited to this particular configuration. It is known to those skilled in the art that the separation of entrained water droplets from steam may also be accomplished by mechanical arrangements utilizing gravitational and inertial principles.

Figure 4:
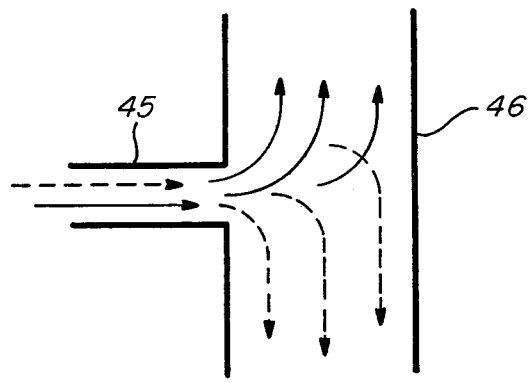
FIGS. 4, 5, and 6 schematically represent mechanical separators for separating steam and liquid droplets.
Figure 5:
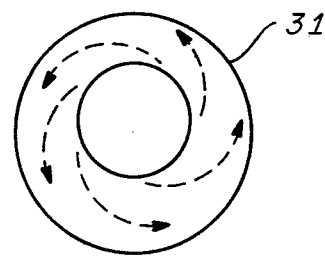
Figure 6:
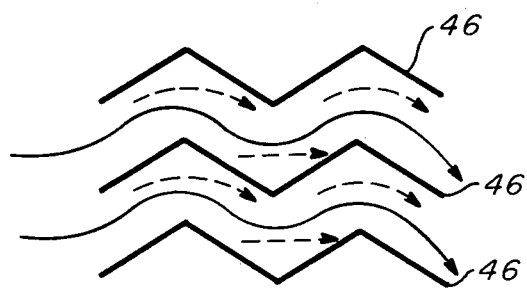

In FIGS. 4, 5, and 6 the three major types of mechanical separators, i.e., gravitational, centrifugal, and inertial, are schematically illustrated. The flow of vapor is represented by solid arrows and the flow of liquid droplets is represented by dashed arrows. Gravitational separators of the type in FIG. 4 may be typically formed by joining a horizontal pipe 45 and a vertical pipe 46 and disposing a liquid trap at the bottom outlet of the vertical pipe. The centrifugal separator of FIG. 5 may be formed with appropriately shaped vanes 31 as in FIG. 1. Inertial separators of the type in FIG. 6 may be typically formed by using baffles 46. Accordingly, the apparatus of the present invention may be modified depending upon the particulars of the boiler design and the degree of separation required, thereby allowing the use of centrifugal, gravitational, or inertial separators.

While the invention has been described in its preferred embodiments, it is to be understood that the words which have been used are words of description rather than limitation and that changes may be made within the purview of the appended claims without departing from the true scope and spirit of the invention in its broader aspects.

I claim:

1. An improved geothermal pumping system of the type having a boiler for vaporizing a working fluid with thermal energy from geothermal brine and a turbine driven pumping unit which is disposed in the geothermal brine and which is driven by the vaporized working fluid, wherein the improvement comprises:

means for separating liquid droplets from the vaporized working fluid exhausted from said boiler; and means for collecting the separated liquid and for returning the liquid in a vaporized form to the vaporized working fluid exhausted from said turbine pumping unit.

2. An apparatus according to claim 1 wherein the separating means includes swirler vanes disposed above said turbine driven pumping unit and below said boiler, whereby centrifugal forces induce liquid droplets to be separated from the downwardly flowing vaporized working fluid.

3. An apparatus according to claim 1 wherein said separating means includes a gravitational separator.

4. An apparatus according to claim 1 wherein said separating means includes an inertial separator.

5. An apparatus according to claim 2, 3 or 4 wherein said collecting means includes a liquid trap disposed below said separating means and above said turbine driven pumping unit.

6. An apparatus according to claim 5 wherein said collecting means further includes a plurality of orifices for flashing the collected liquid into the exhaust from said pumping unit and a plurality of pipes for conducting the downwardly flowing vaporized working fluid to said turbine driven pumping unit.

* * * * *